(12) United States Patent
Girish

(10) Patent No.: US 10,716,432 B2
(45) Date of Patent: Jul. 21, 2020

(54) SELF-HEATING POUCH AND METHOD OF MANUFACTURE THEREOF

(71) Applicant: EXTOVATE VENTURE LLP., Bangalore (IN)

(72) Inventor: Vedanth Girish, Bangalore (IN)

(73) Assignee: EXTOVATE VENTURE LLP (IN)

( * ) Notice: Subject to any disclaimer, the term of this patent is extended or adjusted under 35 U.S.C. 154(b) by 206 days.

(21) Appl. No.: 15/757,366

(22) PCT Filed: Sep. 3, 2016

(86) PCT No.: PCT/IB2016/055290
§ 371 (c)(1),
(2) Date: Mar. 4, 2018

(87) PCT Pub. No.: WO2017/037681
PCT Pub. Date: Mar. 9, 2017

(65) Prior Publication Data
US 2018/0242779 A1 Aug. 30, 2018

(30) Foreign Application Priority Data
Sep. 3, 2015 (IN) .......................... 4664/CHE/2015

(51) Int. Cl.
*A47J 36/28* (2006.01)
*F24V 30/00* (2018.01)
(Continued)

(52) U.S. Cl.
CPC ........... *A47J 36/28* (2013.01); *A47J 41/0016* (2013.01); *A47J 41/0066* (2013.01);
(Continued)

(58) Field of Classification Search
CPC ....................................................... F23V 30/00
(Continued)

(56) References Cited

U.S. PATENT DOCUMENTS

| 3,970,068 A | * | 7/1976 | Sato | A47J 36/28 126/263.08 |
| 5,465,707 A | * | 11/1995 | Fulcher | A47J 36/28 126/263.01 |

(Continued)

OTHER PUBLICATIONS

International Search Report dated Nov. 23, 2016.

*Primary Examiner* — Avinash A Savani
(74) *Attorney, Agent, or Firm* — Fresh IP PLC; Aubrey Y Chen

(57) ABSTRACT

The present invention relates to a self-heating pouch for heating consumables and method of manufacture thereof. The self-heating pouch includes a flexible housing and a sealable cap. The flexible housing includes an internal pouch, an external pouch, and at least one frangible button. The internal pouch includes an inner surface and an outer surface. The inner surface of the internal pouch is configured to enclose the consumables. The external pouch is attached internally to the outer surface of the internal pouch. The at least one frangible button is included between the external pouch and the internal pouch. The at least one frangible button is configured to release a liquid to react with a heating agent and initiate heating of the consumables. The sealable cap is attached to top of the flexible housing and configured to dispense the consumables.

18 Claims, 13 Drawing Sheets

(51) Int. Cl.
*A47J 41/00* (2006.01)
*B65B 25/22* (2006.01)
*B65D 81/34* (2006.01)

(52) U.S. Cl.
CPC ........... *A47J 41/0072* (2013.01); *B65B 25/22* (2013.01); *B65D 81/3484* (2013.01); *F24V 30/00* (2018.05)

(58) Field of Classification Search
USPC .................................................. 126/263.07
See application file for complete search history.

(56) References Cited

U.S. PATENT DOCUMENTS

| | | |
|---|---|---|
| 6,289,889 B1 | 9/2001 | Bell et al. |
| 7,708,009 B1 * | 5/2010 | Collins ..................... A61F 7/03 |
| | | 126/204 |

* cited by examiner

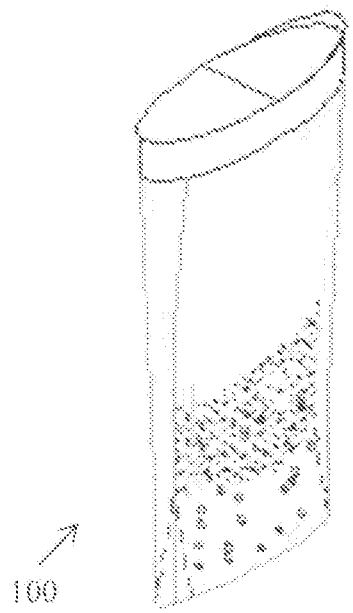
FIG. 7A
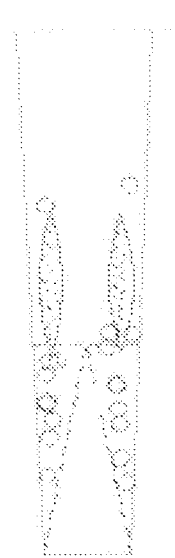 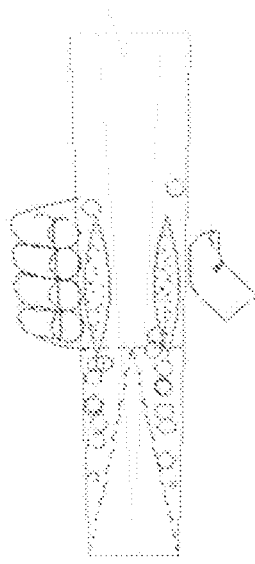 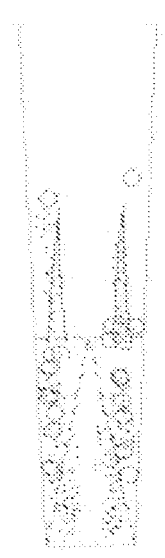
FIG. 7B  FIG. 7C  FIG. 7D

SELF-HEATING POUCH AND METHOD OF MANUFACTURE THEREOF

CROSS-REFERENCE TO RELATED APPLICATIONS

This application claims priority to Indian Provisional Patent Application No. 4664/CHE/2015, filed on Sep. 3, 2015, which is incorporated herein by reference in its entirety.

FIELD OF THE INVENTION

The present invention generally relates to self-heating packaging and more particularly to a self-heating pouch for incorporation in food industry and medical industry and a method of manufacture thereof.

BACKGROUND TO THE INVENTION

Conventional styles of cooking and heating consumables, for example food, typically include using a stove, firewood, an oven, and the like. However, consumers are mostly on a move and do not always have access to such forms of heating. For instance, during travel (for example, in aircrafts and railways) or at offices there is usually a lack of heating facilities to heat any liquid or solid food and the consumers end up eating cold food. The consumers can be exposed to health risks by eating the cold food. Further, the consumers tend to order take away food in order to eat warm food, however the take away food is also not a healthy option.

Ready-to-eat products sold in markets today are a good option but require access to hot water to heat the consumables. Further, such ready-to-eat products also require another equipment to eat the consumables. Other forms of heating, for example self-heating, were hence introduced to help the consumers have consumables of choice and in heated form. However, such forms of heating do not provide uniform heating to the consumables.

SUMMARY OF THE INVENTION

This summary is provided to introduce a selection of concepts in a simplified form that are further described below in the detailed description. This summary is not intended to identify key or essential features of the claimed subject matter, nor is it intended to be used as an aid in determining the scope of the claimed subject matter.

A self-heating pouch for heating consumables includes a flexible housing and a sealable cap. The flexible housing includes an internal pouch, an external pouch, and at least one frangible button. The internal pouch includes an inner surface and an outer surface. The inner surface of the internal pouch is configured to enclose the consumables. The external pouch is attached internally to the outer surface of the internal pouch. The at least one frangible button is included between the external pouch and the internal pouch. The at least one frangible button is configured to release a liquid to react with a heating agent and initiate heating of the consumables. The sealable cap is attached to top of the flexible housing and configured to dispense the consumables.

An example of a method of manufacturing a self-heating pouch for heating consumables includes providing a first flexible material and a second flexible material to a corresponding die for forming an internal pouch and an external pouch, respectively. The internal pouch and the external pouch form a flexible housing. The internal pouch includes an inner surface and an outer surface. The method also includes partially sealing the outer surface of the internal pouch to the external pouch. Further, the method includes adding at least one frangible button and a heating agent between the outer surface of the internal pouch and the external pouch. The at least one frangible button includes a liquid to react with the heating agent and initiate heating of the consumables. Moreover, the method includes adding a sealable cap to top of the flexible housing. The sealable cap is sealed with the internal pouch and the external pouch.

To further clarify advantages and features of the present invention, a more particular description of the invention will be rendered by reference to specific embodiments thereof, which is illustrated in the appended figures. It is appreciated that these figures depict only typical embodiments of the invention and are therefore not to be considered limiting of its scope.

BRIEF DESCRIPTION OF THE FIGURES

The invention will be described and explained with additional specificity and detail with the accompanying figures in which:

FIG. 7A illustrates a side perspective view of a self-heating pouch, in accordance with an embodiment;

FIGS. 7B-7D illustrate a process of heating consumables using a self-heating pouch, in accordance with an embodiment;

Further, skilled artisans will appreciate that elements in the figures are illustrated for simplicity and may not have been necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those of ordinary skill in the art having benefit of the description herein.

DESCRIPTION OF THE INVENTION

For the purpose of promoting an understanding of the principles of the invention, reference will now be made to the embodiment illustrated in the figures and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present invention will be described below in detail with reference to the accompanying figures.

Figure 1A:
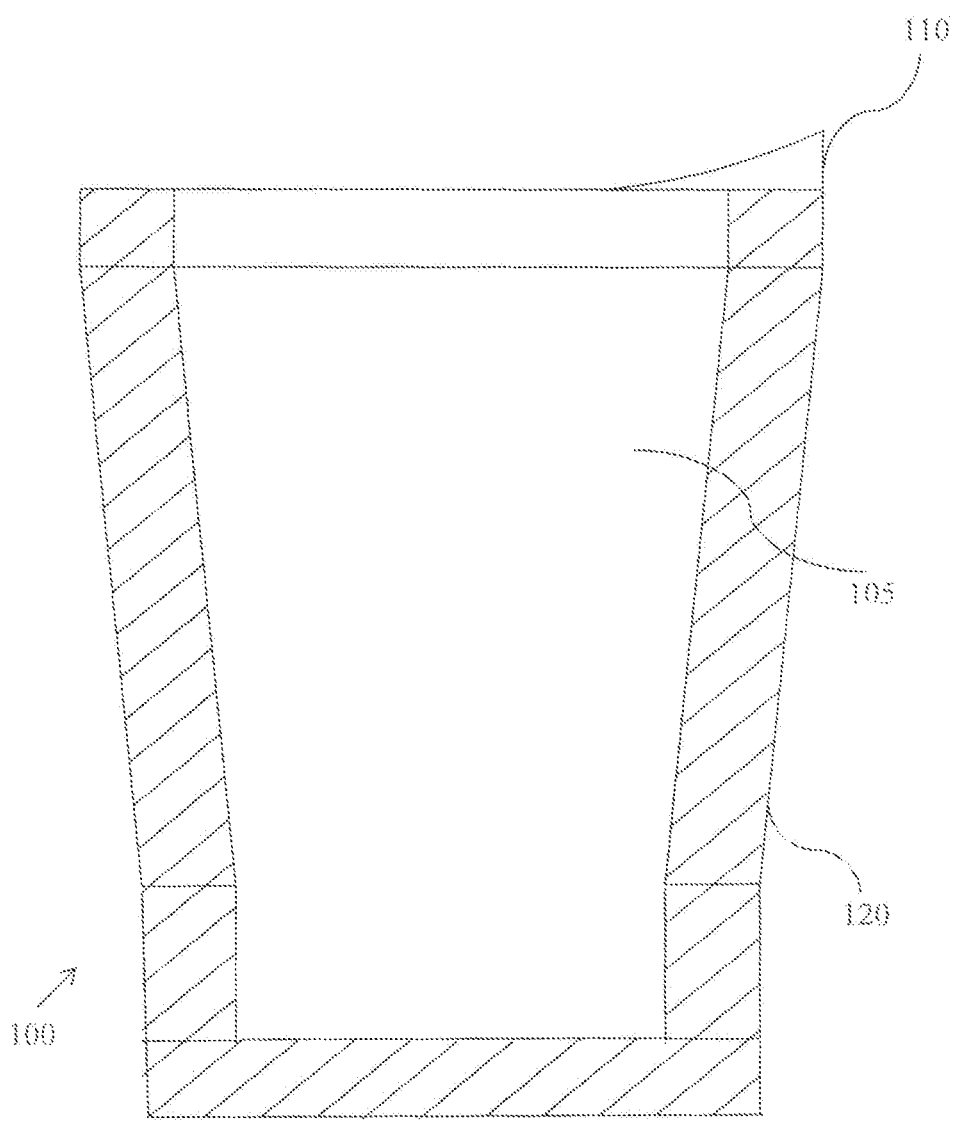
FIG. 1A illustrates a front perspective view of an external pouch of a self-heating pouch, in accordance with an embodiment.

FIG. 1A illustrates a front perspective view of an external pouch of a self-heating pouch 100, in accordance with an embodiment. Herein, the 'self-heating pouch' 100 is a flexible disposable container that is used for packaging consumables, for example food (both solids and liquids), pharmaceuticals, and the like, that require to be heated. In an example, a consumer can buy the self-heating pouch 100 that comes pre-stored with the consumables and heat the consumables as and when required. In another example, the consumer can use the self-heating pouch 100 for storing the consumables and heating the consumables whenever necessary. The self-heating pouch 100 includes a flexible housing 105 and a sealable cap 110. The flexible housing 105 includes an internal pouch 115 (not shown in FIG. 1A), an external pouch 120, and at least one frangible button (not shown in FIG. 1A).

Figure 1B:
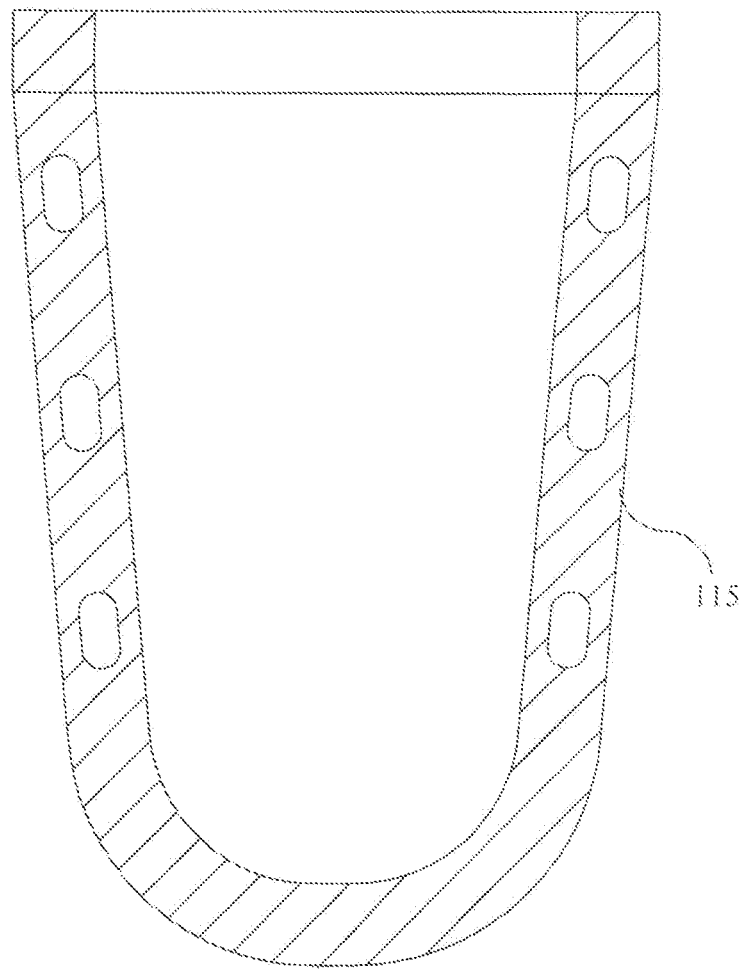
FIG. 1B illustrates a front perspective view of an internal pouch of a self-heating pouch, in accordance with an embodiment.

In an example, the self-heating pouch 105 is trapezoidal in shape. The self-heating pouch 100 can also be manufactured in different shapes and sizes and is not limited to the illustrated shapes and sizes. The external pouch 120 is as illustrated in FIG. 1A and the internal pouch is as illustrated in FIG. 1B. The external pouch 120 is shaped as a trapezoid and the internal pouch 115 has a circular bottom portion. The internal pouch 115 defines a first side wall and a second side wall and the external pouch 120 defines a third side wall and a fourth side wall. The first side wall and the second side wall are sealed at periphery and define an opening at top to enclose the consumables within the inner surface of the internal pouch 115. The third side wall and the fourth side wall are sealed at the periphery, define the opening at the top, and are partially sealed to the outer surface of the internal pouch 115 to enclose the at least one frangible button and a heating agent.

The self-heating pouch 100 is further explained with reference to following figures.

Figure 2A:
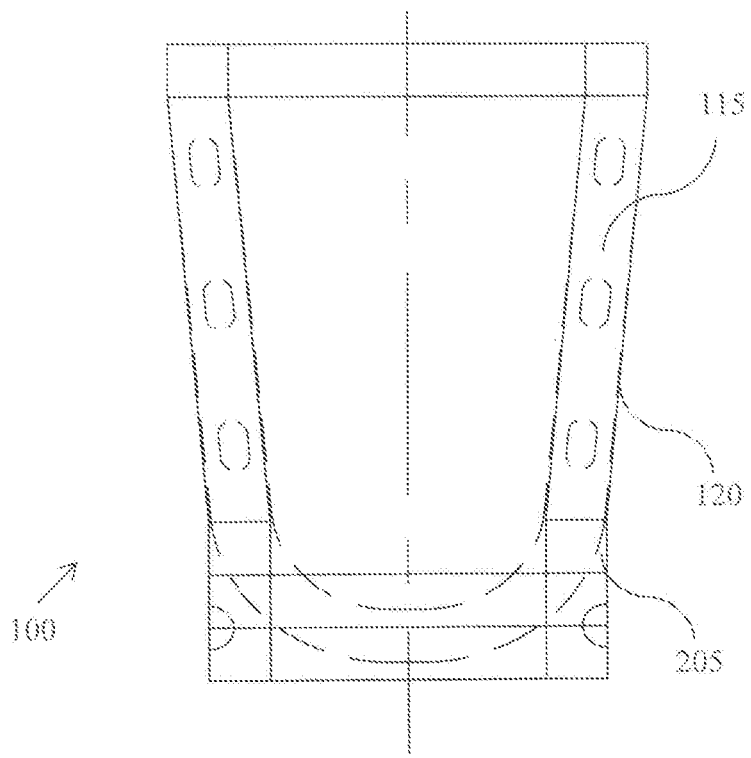
FIG. 2A illustrates a front perspective view of an external pouch fitted to an internal pouch of a self-heating pouch, in accordance with an embodiment.
Figure 2B:
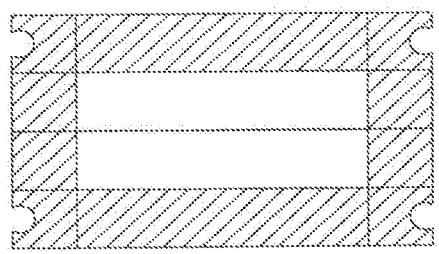
FIG. 2B illustrates a front perspective view of a bottom portion sealing of a self-heating pouch, in accordance with an embodiment.

FIG. 2A illustrates a front perspective view of the external pouch 120 fitted to the internal pouch 115 of the self-heating pouch 100, in accordance with an embodiment. The internal pouch 115 is fitted within the external pouch 120 such that the circular bottom portion is above a bottom edge of the external pouch 120. A bottom portion sealing 205 is sealed at bottom of the external pouch 120, as illustrated in FIG. 2A. The bottom portion sealing 205 is illustrated in detail in FIG. 2B.

Figure 3:
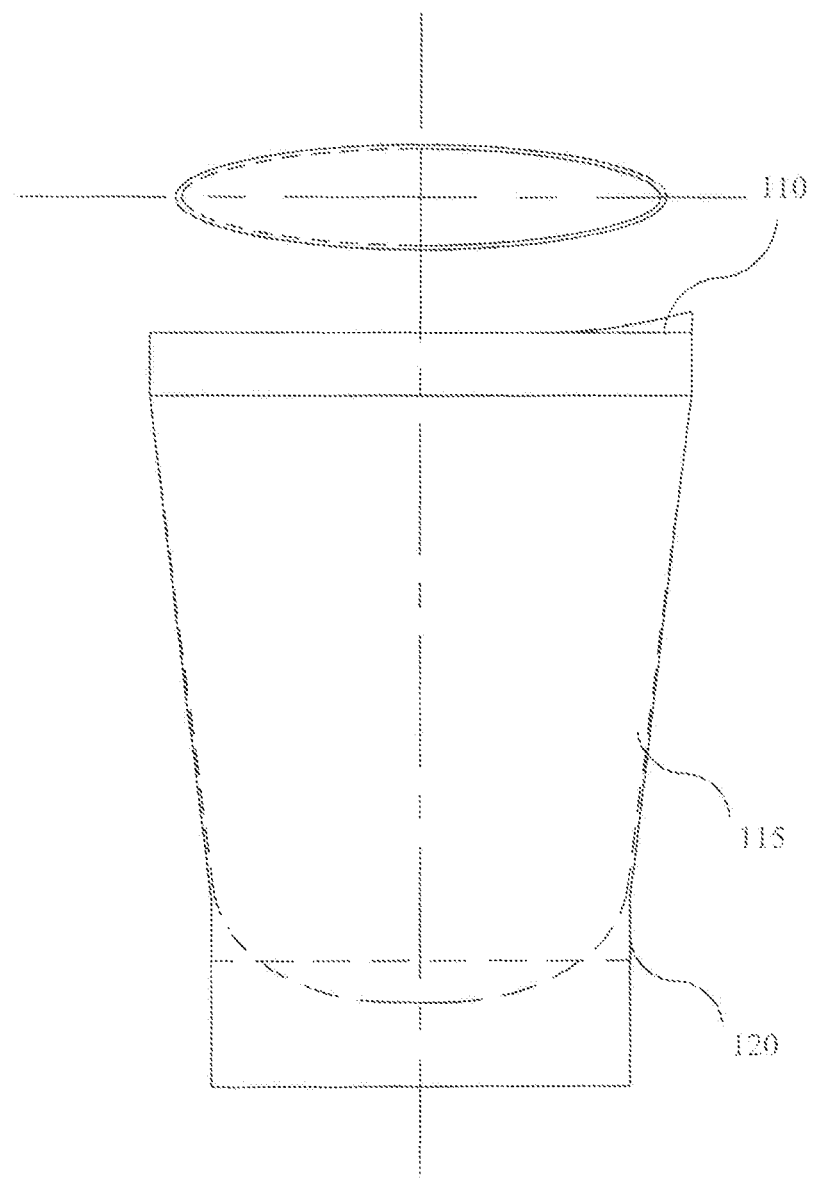
FIG. 3 illustrates a front perspective view of sealing between an internal pouch and an external pouch of a self-heating pouch, in accordance with an embodiment.

FIG. 3 illustrates a front perspective view of sealing between the internal pouch 115 and the external pouch 120 of the self-heating pouch 100, in accordance with an embodiment. The internal pouch 115 includes an outer surface and an inner surface. The inner surface of the internal pouch 115 is configured to enclose the consumables. The outer surface of the internal pouch 115 is partially attached to the external pouch 120, as illustrated in FIG. 3. As shown, the outer surface of the internal pouch 115 is closely sealed to the external pouch 120 towards top. However, the circular bottom portion of the internal pouch 115 is not attached to the external pouch 120, thereby leaving some space between the outer surface of the internal pouch 115 and the external pouch 120.

Figures 4A, 4B:
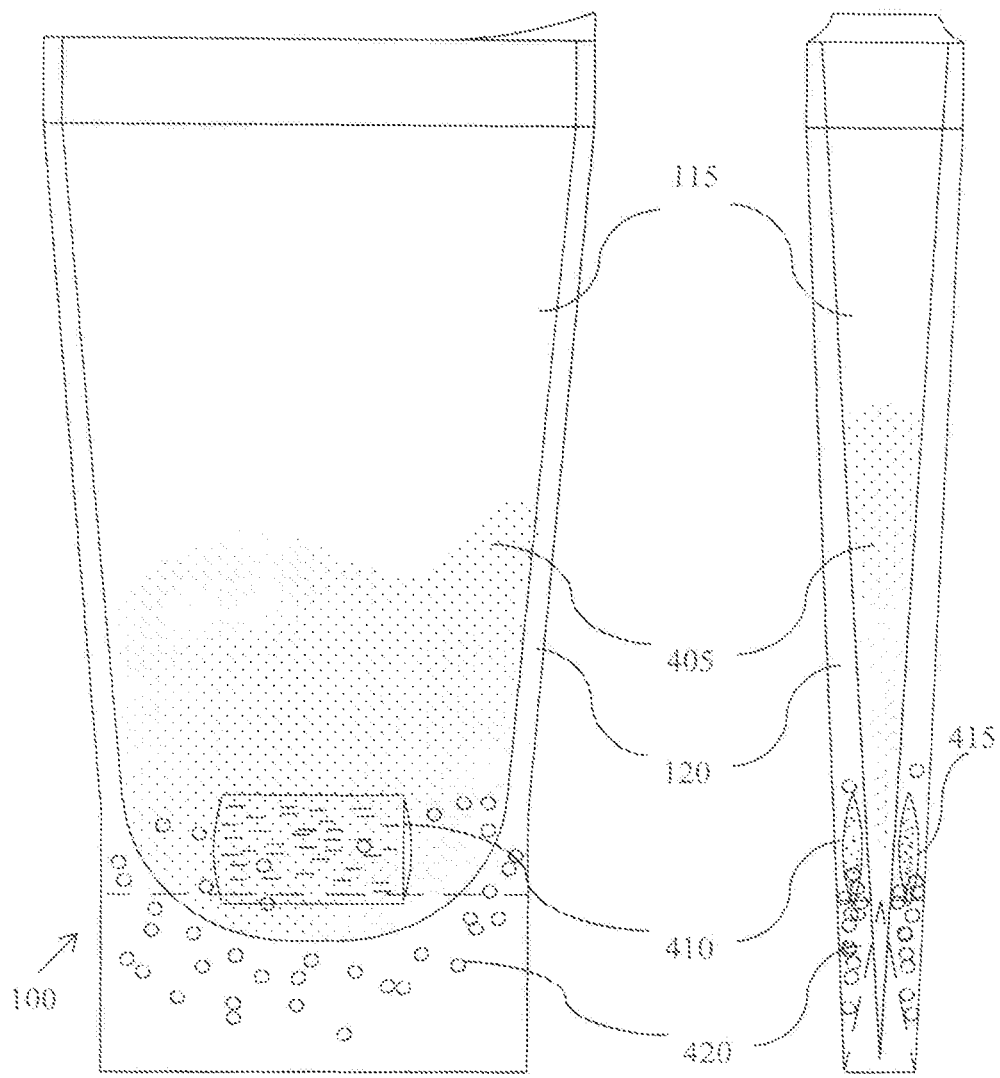
FIG. 4A illustrates a front perspective view of a cross section of a self-heating pouch, in accordance with an embodiment.
FIG. 4B illustrates a side perspective view of a cross section of a self-heating pouch, in accordance with an embodiment.

FIG. 4A illustrates a front perspective view and FIG. 4B illustrates a side perspective view of a cross section of the self-heating pouch 100, in accordance with an embodiment. The inner pouch 115 is configured to include consumables 405 within the inner surface. At least one frangible pouch, for example a frangible pouch 410 and a frangible pouch 415, is included in the space between the outer surface of the internal pouch 115 and the external pouch 120. In an example, the at least one frangible pouch is manufactured using a frangible material and is protected by a sealant that can maintain a limited amount of pressure. Two frangible pouches, as illustrated in FIG. 4B, can be used simultaneously for providing even heating. The two frangible pouches can also be used alternately. However, it should be noted that even one frangible pouch can be present in the self-heating pouch 100 for heating the consumables. A heating agent 420 is also present between the outer surface of the internal pouch 115 and the external pouch 120. A side perspective view of the self-heating pouch 100 is illustrated in FIG. 7A.

Figure 5A:
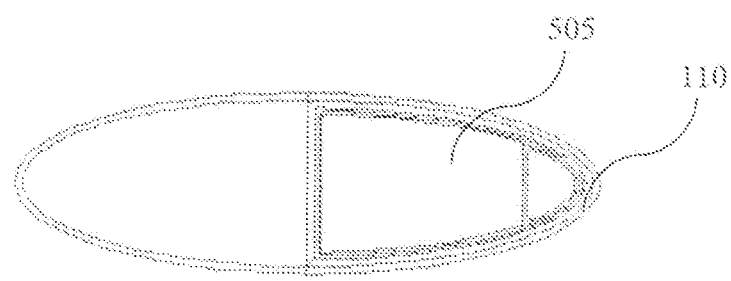
FIG. 5A illustrates a top view of a sealable cap of a self-heating pouch, in accordance with an embodiment.

FIG. 5A illustrates a top view of the sealable cap 110 of the self-heating pouch 100, in accordance with an embodiment. The sealable cap 110 is attached to top of the flexible housing 105 and is configured to dispense the consumables. The sealable cap 110 is oval in shape. However, in other embodiments, the sealable cap 110 can be in any other shape, and is not limited to an oval shape. The sealable cap 110 is attached to the opening at the top of the internal pouch 115 and the external pouch 120. The top of the internal pouch 115 and the external pouch 120 is further heat sealed.

Figure 5B:
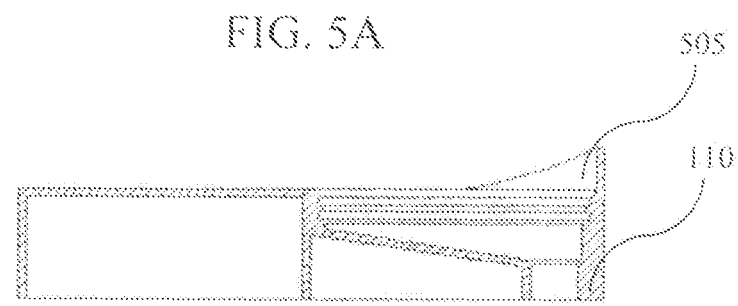
FIG. 5B illustrates a front view of a sealable cap of a self-heating pouch, in accordance with an embodiment.

The sealable cap 110 includes a flip lid 505 to receive and dispense the consumables. A front view of the sealable cap 110 of the self-heating pouch 100 is illustrated in FIG. 5B. The flip lid 505 can open out at an angle, for example a 90 degree angle, at mid-section of the sealable cap. However, in other embodiments, the flip lid 505 can open out at a 90 degree angle at one end of the sealable cap and not only at the mid-section of the sealable cap.

In an embodiment, the flip lid is configured to enable access to a heat sealant tear-off portion.

Figures 5C, 5D:
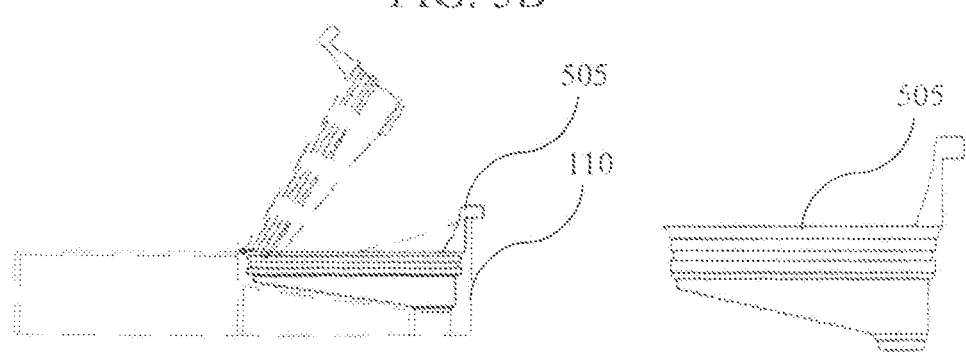
FIG. 5C illustrates a front perspective view of a sealable cap of a self-heating pouch with an open flip lid, in accordance with an embodiment.
FIG. 5D illustrates a front perspective view of a flip lid of a sealable cap of a self-heating pouch, in accordance with an embodiment.

FIG. 5C illustrates a front perspective view of the sealable cap 110 of the self-heating pouch 100 with an open the flip lid 505 open, in accordance with an embodiment. The flip lid 505, originally in a closed position, can be opened by a user to an open position. A front perspective view of the flip lid 505 is illustrated in FIG. 5D. The flip lid can include a handle or spout at top, has multiple flanges for attachment, and a narrow bottom portion.

Figure 6A:
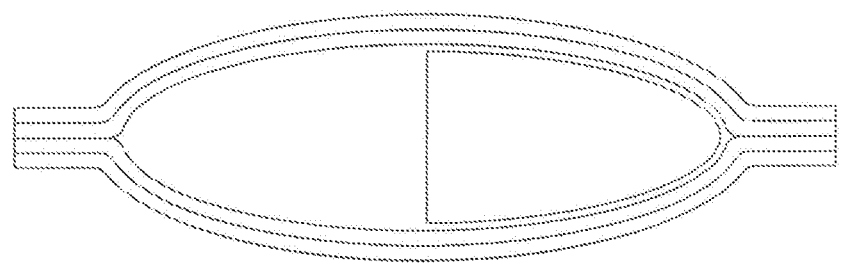
FIG. 6A illustrates a top perspective view of sealing by a sealable cap, in accordance with prior art.
Figure 6B:
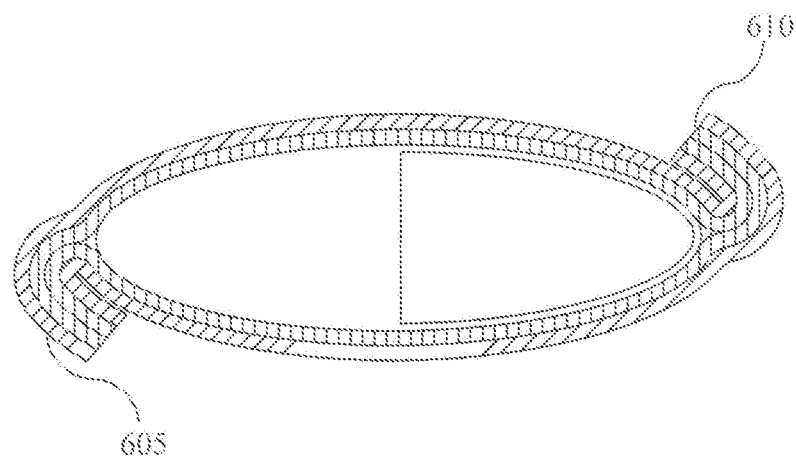
FIG. 6B illustrates a top perspective view of sealing by a sealable cap, in accordance with an embodiment.

FIG. 6A illustrates a top perspective view of sealing by a sealable cap, in accordance with prior art. The sealing in the prior art is horizontal at each end. The user hence finds difficulty in gripping a pouch with such sealing. FIG. 6B illustrates a top perspective view of sealing by the sealable cap 110 of the self-heating pouch 100, in accordance with an embodiment. The sealing of the sealable cap 110 includes a first sideward curve 605 and a second sideward curve 610. The first sideward curve 605 and the second sideward curve 610 allow the user to easily grip the self-heating pouch 100 when required.

FIGS. 7B-7D illustrate a process of heating consumables using the self-heating pouch 100, in accordance with an embodiment. FIG. 7B illustrates initial state of the self-heating pouch 100 that the user typically buys. The frangible pouches 410 and 415 are in position and are unopened. FIG. 7C illustrates a user using fingers of a hand to compress the frangible pouches 410 and 415. FIG. 7D illustrates the frangible pouches 410 and 415 in compressed state and the liquid in the frangible pouches released into the heating agent 420. The liquid reacts with the heating agent 420 to cause an exothermic reaction for generating heat. The heat thus generated is used for heating the consumables in the inner pouch 115.

In an example, the liquid is one of a potable liquid and a non-potable liquid. The liquid further includes a high density of water molecules.

The user now can drink or eat from the self-heating pouch 100 once heated. The self-heating pouch 100 further includes bio degradable insulation applied to the outer surface of the internal pouch 115 to protect the user from the heat. The self-heating pouch 100 is usable under all temperatures. The self-heating pouch 100 is manufactured using a unique composition of material in a retort structure. The material used for the self-heating pouch 100 includes a 5 layer structure that controls the heat and reflects the heat into the internal pouch 115. The heat that is reflected is then passed on to the consumables in the internal pouch 115.

The material used to make the self-heating pouch 100 is with a specialized structure which helps sustain heat up to 180 degree Celsius. The bio degradable insulation can sustain the heat up to 150 degrees Celsius. The self-heating pouch 100 can maintain a similar temperature for up to 20 minutes. Therefore, the efficiency of the self-heating pouch 100 is higher and the consumables are heated is under 5 to 7 minutes. The self-heating pouch 100 can also heat undercooked home food to edible food or cook pre-processed food into a meal. For example, the self-heating pouch 100 is used to heat pizza, meat, sandwiches, dehydrated foods, baby food, liquids, semi solids, and other foods as well.

Figure 8:
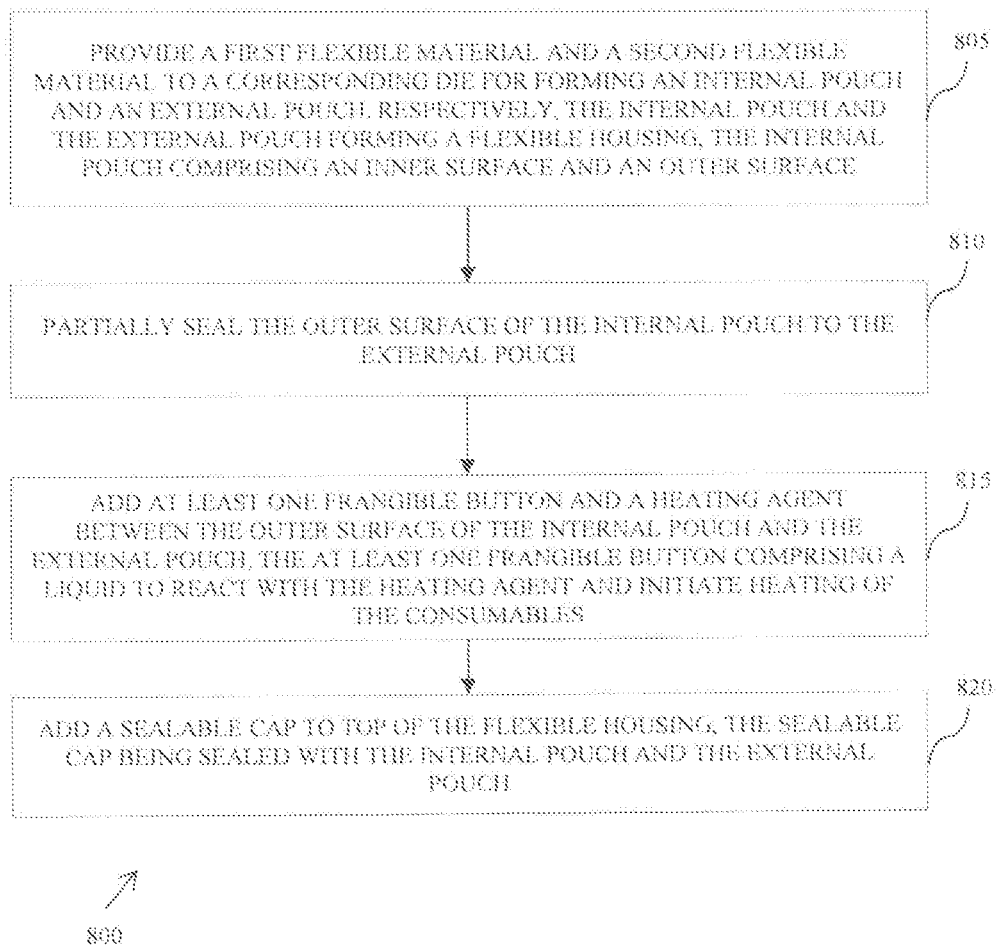
FIG. 8 illustrates an example flow diagram of a method for manufacturing a self-heating pouch for heating consumables, in accordance with an embodiment.

FIG. 8 illustrates an example flow diagram of a method 800 for manufacturing a self-heating pouch, for example the self-heating pouch 100 of FIG. 1A, for heating consumables, in accordance with an embodiment. The consumables can be in a powder form or in a mixture form.

At step 805, the method 800 includes providing a first flexible material and a second flexible material to a corresponding die for forming shapes of an internal pouch, for example the internal pouch 115, and an external pouch, for example the external pouch 120, respectively. The internal pouch and the external pouch form a flexible housing, for example the flexible housing 105. The internal pouch includes an inner surface and an outer surface.

The shapes of the internal pouch and the external pouch are further aligned.

At step 810, the method 800 includes partially sealing the outer surface of the internal pouch to the external pouch. During the sealing, the shapes of the internal pouch and the external pouch are sealed horizontally. The flexible housing is then formed by further sealing the internal pouch to the external pouch. In an example, 4 laminates are sealed together.

In some embodiments, the flexible housing is air vacuumed for removal of moisture.

At step 815, the method 800 includes adding at least one frangible button, for example the frangible buttons 410 and 415 of FIG. 4B, and a heating agent, for example the heating agent 420, between the outer surface of the internal pouch and the external pouch. The at least one frangible button includes a liquid to react with the heating agent and initiate heating of the consumables. The self-heating pouch is then secured with a final sealing on each side.

In some embodiments, the liquid is added into the at least one frangible pouch and the at least one frangible pouch is then sealed. The at least one frangible button is configured to release the liquid on being compressed (see FIGS. 7B to 7D).

In an example, the liquid is one of a potable liquid and a non-potable liquid. The liquid further includes a high density of water molecules.

At step 820, the method 800 includes adding a sealable cap, for example the sealable cap 110, to top of the flexible housing. The sealable cap is sealed with the internal pouch and the external pouch. The sealable cap includes a flip lid to receive and dispense the consumables. The flip lid is configured to enable access to a heat sealant tear-off portion.

In some embodiments, the sealable cap includes a first sideward curve and a second sideward curve for enabling a user to grip the self-heating pouch.

The method 800 further includes adding the consumables in the inner surface of the internal pouch. The consumables are further secured in the flexible pouch by heat sealing top of the internal pouch and the external pouch. The self-heating pouch is then discharged from machine.

It should be noted that the above method of manufacture of the self-heating pouch 100 can be applied for manufacturing similar products, for example self-heating plates, spoons, boxes, food trays, and the like, and is not limited to the self-heating pouch 100. Similarly, it should be noted that the self-heating technology used in the self-heating pouch 100 can be applied for heating food of different forms and kinds in other similar products mentioned above.

Figure 9:
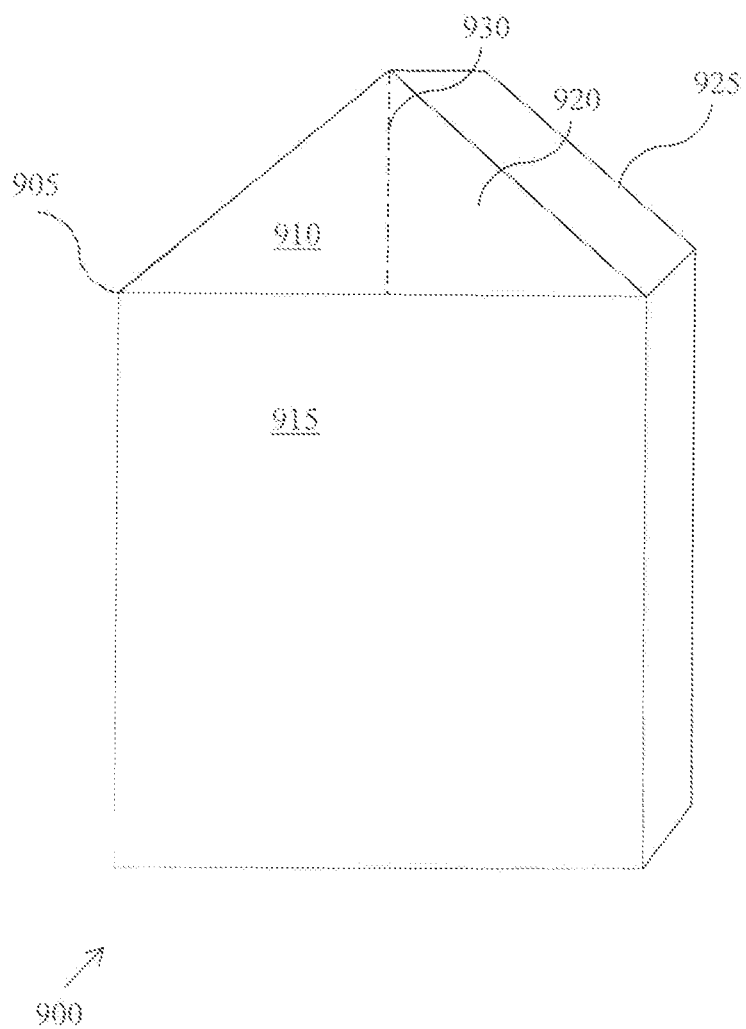
FIG. 9 illustrates a side perspective view of a self-heating pouch, in accordance with another embodiment.

FIG. 9 illustrates a side perspective view of a self-heating pouch 900, in accordance with another embodiment. The self-heating pouch 900 is another embodiment of the self-heating pouch 100 of FIG. 1A. The self-heating pouch 900 includes a housing 905. The housing 905 includes a top portion 910 and a bottom portion 915. In an example, the top portion 910 is triangular in shape and the bottom portion 915 is rectangular or square shaped. The top portion 910 of the housing 905 includes a front wall 920 and a rear wall 925. The front wall 920 of the top portion 910 of the housing 905 includes a tear-off portion 930. The tear-off portion 930 can include a perforated edge that enables the consumer to easily open the self-heating pouch 900.

In some embodiments, the self-heating pouch 900 can be included within a cardboard housing to enhance packaging or to provide product description. The bottom portion 915 can be fixed to the cardboard housing. The self-heating pouch 900 is further explained with reference to FIG. 10.

Figure 10:
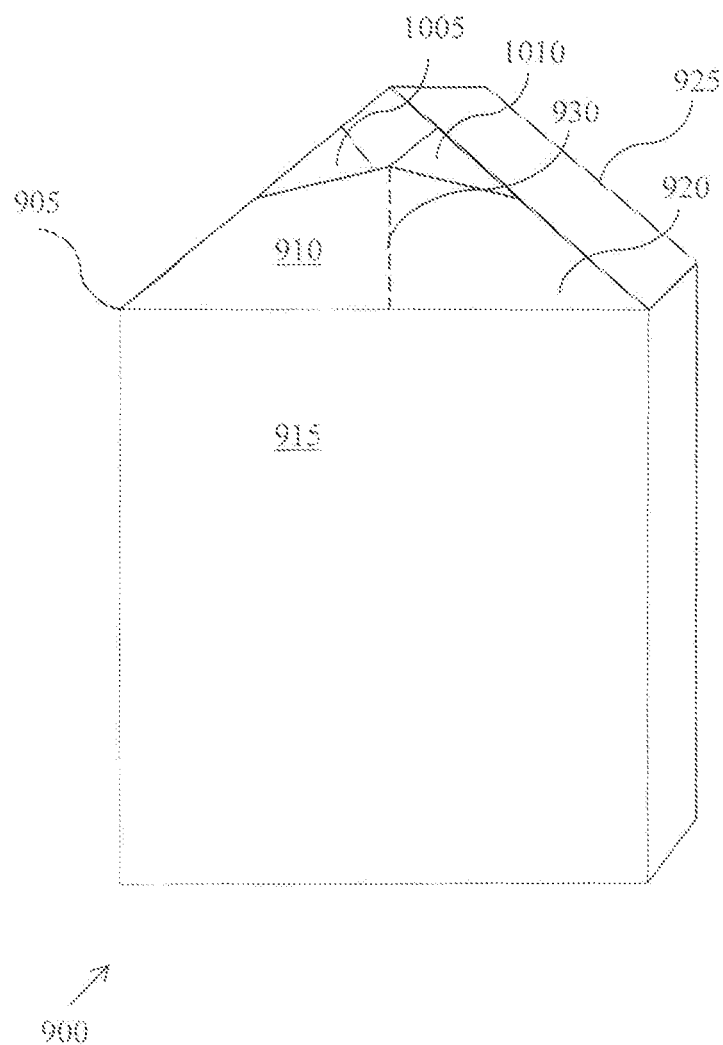
FIG. 10 illustrates a side perspective view of a self-heating pouch, in accordance with another embodiment.

FIG. 10 illustrates a side perspective view of the self-heating pouch 900, in accordance with another embodiment. The consumer can open the self-heating pouch 900 by pulling on the tear-off portion 930 along the perforated edge. As illustrated, the front wall 920 of the top portion 910 is illustrated to be peeled into a first layer 1005 and a second layer 1010. The first layer 1005 and the second layer 1010 can be peeled off completely along the perforated edge of the tear-off portion 930. In an example, the first layer 1005 and the second layer 1010 are subsequently discarded. The self-heating pouch 900 is further explained with reference to FIG. 11.

Figure 11:
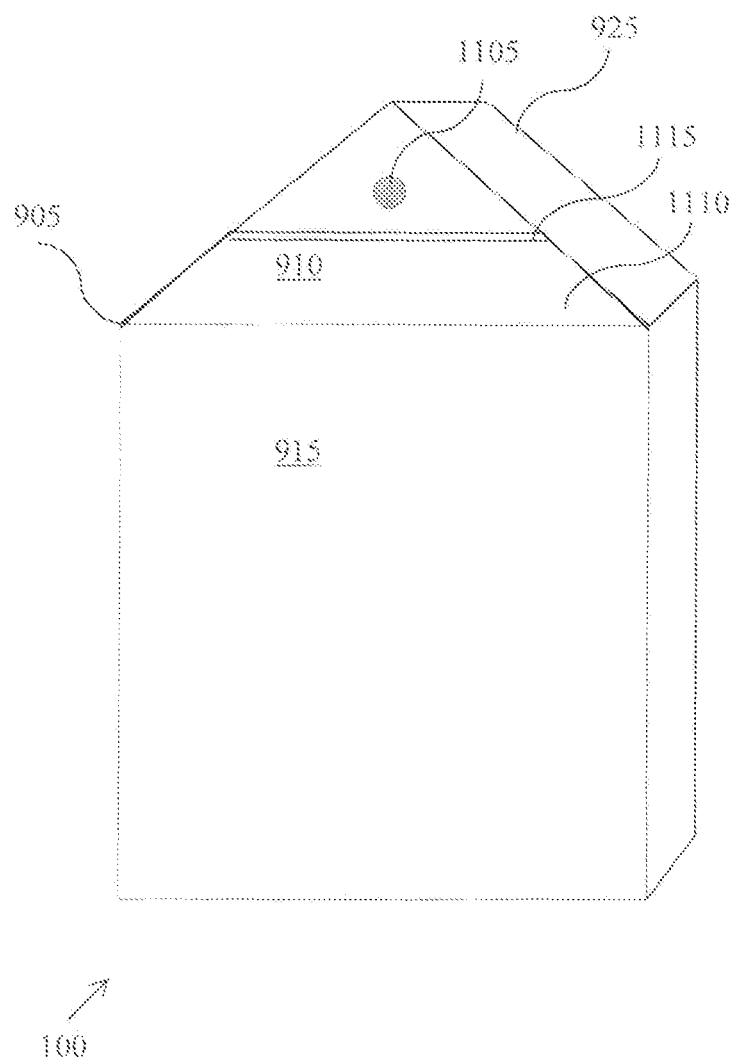
FIG. 11 illustrates a side perspective view of a self-heating pouch, in accordance with another embodiment.

FIG. 11 illustrates a side perspective view of the self-heating pouch 900, in accordance with another embodiment. On discarding the first layer 1005 and the second layer 1010 of the top portion 910, the self-heating pouch 900 is illustrated to include a notch opening 1105 located on the rear wall 925 of the top portion 910. The notch opening 1105 is used for receiving water (for example, potable water or non-potable water). The self-heating pouch 900 further includes a zip lock portion 1110. The zip lock portion 1110 is attached to the bottom portion 915 of the self-heating pouch 900 and includes a zip lock 1115. In an example, the zip lock 1115 is a press type zip lock that blocks off air from entering into the bottom portion 915. The zip lock 1115 can be pulled open and the consumables can be placed in an interior of the bottom portion 915. The bottom portion 915 of the self-heating pouch 900 is further explained with reference to FIG. 12.

Figure 12:
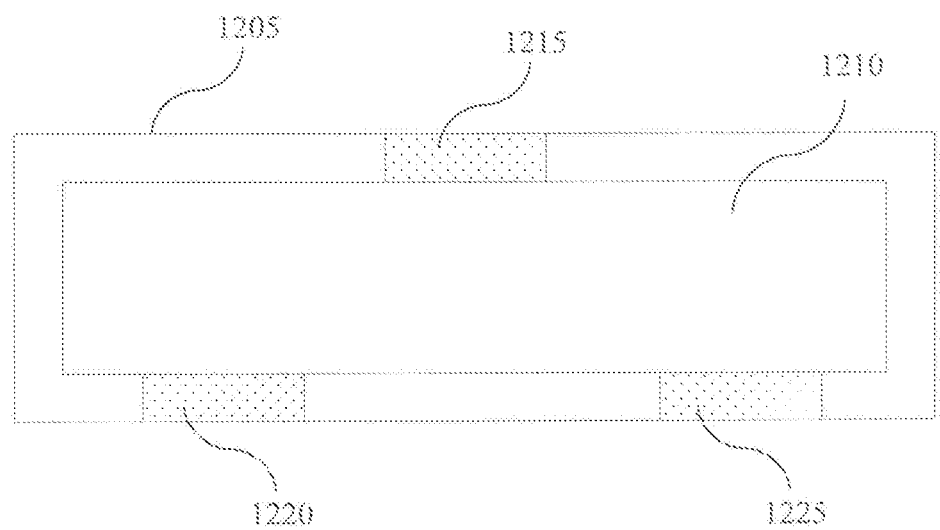
FIG. 12 illustrates a cross-sectional view of a bottom portion of a self-heating pouch, in accordance with another embodiment.

FIG. 12 illustrates a cross-sectional view of the bottom portion 915 of the self-heating pouch 900, in accordance with another embodiment. The bottom portion 915 includes an external pouch 1205 and an internal pouch 1210. In one example, the external pouch 1205 and the internal pouch 1210 includes BON membranes. The bottom portion 915 further includes one or more slots located between the external pouch 1205 and the internal pouch 1210. Herein, the 'slots' refer to narrow compartments that are structured to include a heating agent. In one example, the heating agent includes calcium oxide combined with one or more dispersing agents. In this embodiment, three slots, for example a slot 1215, a slot 1220 and a slot 1225 are arranged between the external pouch 1205 and the internal pouch 1210. In an example, the three slots are typically filled in a de-humidified environment. The three slots are arranged in a semi-circular manner in order to provide equal heating the consumables placed within interior of the internal pouch 1210. The external pouch 1205 is further sealed with the internal pouch 1210 at borders.

The water received through the notch opening 1105 fills remaining spaces (other than the three slots) between the external pouch 1205 and the internal pouch 1210. The water reacts with the heating agent in the three slots to cause an exothermic reaction and provide uniform heating of the consumables. In one example, the heat generated by the heating agent during the exothermic reaction is 180 degree centigrade. In one example, heating process of the consumables is around 4 to 5 minutes for a pre-defined ratio of water. The heating agent is chosen as a mixture that sustains heat for a period of time, for example 45 minutes, and prevents rise in volume post the exothermic reaction. Further, there is no transfer of the heat to exterior of the external pouch 1205 that is in contact with a consumer. An example usage of the self-heating pouch 900 is explained below.

In an example scenario, a consumer opens the self-heating pouch 900 by pulling apart the tear-open portion 930 and discarding the first layer 1005 and the second layer 1010. The consumer further unseals the zip lock 1115 of the zip lock portion 1110 and fills the interior of the internal pouch 1210 with consumables, for example solid food. The consumer can reseal the zip lock 1115 and carry the self-heating pouch 900 to work. The consumer, at any meal, can further open the notch opening 1105 and pour the water into the notch opening 1105. The water reacts with the heating agent in the slots (for example the slot 1215, the slot 1220 and the slot 1225) to generate the exothermic reaction in which heat is generated. The heat thus generated provides the uniform heating of the solid food due to placement of the slots. The consumer can use the self-heating pouch 900 as a vessel or bowl to eat the solid food from once the solid food is heated. The consumer can also use the self-heating pouch to heat other food items as long as the heat is generated by the self-heating pouch 900. The self-heating pouch 900 can further be disposed.

In another example scenario, the consumables are already pre-packaged within the self-heating pouch 900. In such a case, the consumer can directly pour the water into the notch opening 1105 (after first layer 1005 and a second layer 1010) and start heating process of the consumables.

In other example scenarios, the self-heating pouch 900 can used by travelers in camping areas or mountaineering to heat food. The self-heating pouch 900 can further be used to defrost frozen food (for example, vegetables) by providing suitable temperatures for the frozen food to attain a normal state for cooking. One such application area of the self-heating pouch 900 for defrosting includes cold countries, for example Scandinavian countries, where the food is received in form of the frozen food in pouches for direct cooking. The self-heating pouch 900 further helps the armed forces to ensure soldiers in colder regions to get hot food.

In some embodiments, the self-heating pouch 900 can be customized according to need of consumers. In one example, the self-heating pouch 900 can have the perforated edge of the tear-open portion 930 along top of the top portion 910 and along the front wall 920.

Various embodiments disclosed herein provide numerous advantages by providing a self-heating pouch for heating consumables uniformly using a direct heating process. The present invention is both easy to use, fast and cost effective. The present invention enables consumables to be heated for immediate consumption. The self-heating pouch further reduces time and procedures for defrosting frozen food, for example vegetables, to normal temperature at a faster pace. The present invention allows no contamination of the consumables, for example from water or other foreign particles. The present invention further does not require any filtration processes to store the consumables. The present invention is used to heat the consumables in houses, industries, hostels, paying guest houses and the like. The present invention is helpful to students and working population to heat food, for example ready-to-eat packets, home food, milk, tea, water, and the like, and use the self-heating pouch as a bowl to eat the food. The present invention is also used for sterilization purposes in medical industry.

While specific language has been used to describe the disclosure, any limitations arising on account of the same are not intended. As would be apparent to a person in the art, various working modifications may be made to the method in order to implement the inventive concept as taught herein.

The figures and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The invention claimed is:

1. A self-heating pouch for heating consumables, the self-heating pouch comprising:
   a flexible housing comprising:
      an internal pouch comprising an inner surface and an outer surface, the inner surface of the internal pouch configured to enclose the consumables;
      an external pouch attached internally to the outer surface of the internal pouch; and
      at least one frangible button comprised between the external pouch and the internal pouch, the at least one frangible button configured to release a liquid to react with a heating agent and initiate heating of the consumables; and
   a sealable cap attached to top of the flexible housing and configured to dispense the consumables, wherein the sealable cap comprises a flip lid to receive and dispense the consumables, and wherein the flip lid is configured to enable access to a heat sealant tear-off portion.

2. The self-heating pouch of claim 1, wherein the internal pouch defines a first side wall and a second side wall.

3. The self-heating pouch of claim 2, wherein the first side wall and the second side wall are sealed at periphery and define an opening at top to enclose the consumables within the inner surface of the internal pouch.

4. The self-heating pouch of claim 3, wherein the external pouch defines a third side wall and a fourth side wall.

5. The self-heating pouch of claim 4, wherein the third side wall and the fourth side wall are sealed at the periphery, define the opening at the top, and are partially sealed to the outer surface of the internal pouch to enclose the at least one frangible button and the heating agent.

6. The self-heating pouch of claim 1, wherein the at least one frangible button is configured to release the liquid on being compressed.

7. The self-heating pouch of claim 1, wherein the liquid is one of a potable liquid and a non-potable liquid, the liquid further comprising water molecules.

8. The self-heating pouch of claim 5, wherein the sealable cap is attached to the opening at the top of the internal pouch and the external pouch, the top of the internal pouch and the external pouch further being heat sealed.

9. The self-heating pouch of claim 1, wherein the sealable cap comprises a first sideward curve and a second sideward curve.

10. A method of manufacturing a self-heating pouch for heating consumables, the method comprising:
    providing a first flexible material and a second flexible material to a corresponding die for forming an internal pouch and an external pouch, respectively, the internal pouch and the external pouch forming a flexible housing, the internal pouch comprising an inner surface and an outer surface;
    partially sealing the outer surface of the internal pouch to the external pouch;
    adding at least one frangible button and a heating agent between the outer surface of the internal pouch and the external pouch, the at least one frangible button comprising a liquid to react with the heating agent and initiate heating of the consumables; and
    adding a sealable cap to top of the flexible housing, the sealable cap being sealed with the internal pouch and the external pouch, wherein the sealable cap comprises a flip lid to receive and dispense the consumables, and wherein the flip lid is configured to enable access to a heat sealant tear-off portion.

11. The method of claim 10 further comprising:
    adding the consumables in the inner surface of the internal pouch.

12. The method of claim 10 further comprising:
    securing the consumables in the flexible pouch by heat sealing top of the internal pouch and the external pouch.

13. The method of claim 12, wherein the consumables comprise one of a powder form and a mixture form.

14. The method of claim 10, wherein adding the at least one frangible button comprises:
    adding the liquid into the at least one frangible pouch, the at least one frangible pouch further being sealed, the at least one frangible button being configured to release the liquid on being compressed.

15. The method of claim 10, wherein adding the at least one frangible button and the heating agent comprises:
    air vacuuming the flexible housing for removal of moisture before addition of the at least one frangible button and the heating agent.

16. The method of claim 10, wherein adding the at least one frangible button and the heating agent comprises:
    securing the self-heating pouch with a final sealing on each side.

17. The method of claim 10, wherein the liquid is one of a potable liquid and a non-potable liquid, the liquid further comprising water molecules.

18. The method of claim 10, wherein the sealable cap comprises a first sideward curve and a second sideward curve.

\* \* \* \* \*